United States Patent [19]
Pentchev et al.

[11] 3,910,822
[45] Oct. 7, 1975

[54] ISOLATION OF GLUCOCEREBROSIDASE FROM HUMAN PLACENTAL TISSUE

[75] Inventors: Peter G. Pentchev, Washington, D.C.; Roscoe O. Brady, Rockville, Md.

[73] Assignee: The United States of America as represented by the Secretary of the Department of Health, Education, and Welfare, Washington, D.C.

[22] Filed: Mar. 14, 1974

[21] Appl. No.: 451,300

[52] U.S. Cl................... 195/62; 195/66 R; 424/94; 424/105
[51] Int. Cl.².................. A61K 37/54; C07G 7/026; C12K 1/00
[58] Field of Search............. 195/66 R, 62; 424/105, 424/94

[56] References Cited
OTHER PUBLICATIONS

Brady et al. — Chem. Abst. Vol. 68, (1968), 111686b.

*Primary Examiner*—Sam Rosen

[57] ABSTRACT

A process by which glucocerebrosidase is isolated from human placenta wherein said tissue is suspended in a solvent, centrifuged, resuspended, homogenized, fractionated and then purified so as to produce a pure enzyme which is a single homogeneous protein which is useful in the treatment of Gaucher's disease.

2 Claims, No Drawings

ISOLATION OF GLUCOCEREBROSIDASE FROM HUMAN PLACENTAL TISSUE

BACKGROUND OF THE INVENTION

The subject invention is directed to a process for preparing a homogeneous enzyme useful in the treatment of Gaucher's disease. Gaucher's disease is a genetic disorder which results in the accumulation of large quantities of glucocerebroside in the reticuloendothelial system of persons having the disease. Early studies of the disease utilized slices of spleen tissue from normal human subjects and patients with Gaucher's disease and revealed no abnormality in pathways for cerebroside formation. Such finds prompted the investigation of the catabolism of glucocerebroside which resulted in evidence of the existence of an enzyme in rat and normal human spleen tissue which catalyzes the cleavage of the glycosidic bond of glucocerebrosides.

Moreover, the metabolic defect in patients with Gaucher's disease has been found to be a deficiency of glucocerebroside-B-glucosidase

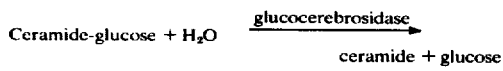

which results in the accumulation of excessive quantities of glucosylceramide (glucocerebroside) in the tissues of individuals with this disorder. The level of activity of the enzyme in patients with Gaucher's disease ranges from 0 to 40% of that in age-matched human tissue specimens. Therefore, there is a high correlation between the severity of the clinical manifestations of the disorder and the degree of attenuation of glucocerebrosidase activity.

The existence of glucocerebrosidase and its relationship have been previously documented, as noted above; however, the isolation of purified glucocerebrosidase has not been previously accomplished. In this connection, it is noted that such an isolation technique is essential for the effective treatment of Gaucher's disease by enzymatic replacement therapy.

SUMMARY OF THE INVENTION

The subject invention, as previously noted, is directed to a process for isolating a useful enzyme, glucocerebrosidase. It is an object of this invention to disclose a process for preparing an enzyme useful in the treatment of Gaucher's disease.

It is a further object of this invention to disclose a process for obtaining glucocerebrosidase from a readily available source.

A still further object of this invention is to prepare glucocerebrosidase in a previously unobtainable state of purity.

PREFERRED EMBODIMENT

The process of the subject invention comprises three separate procedures: the first step comprises extracting the enzyme from placental tissue; the second step comprises the fractionation of the enzyme and the third step is directed toward the purification thereof.

The enzyme is initially extracted from human placenta by grinding chilled fresh placentas which have previously been freed of any adhering blood by rinsing with water. The ground tissue is then suspended in water and stirred at a temperature of from about 1°C to about 20°C for a period of from about 5 minutes to about 4 hours. Preferably, the suspension is chilled from about 1°C to about 8°C for a period of from 30 minutes to about 90 minutes. The resulting suspension is then centrifuged and the resultant supernatant decanted therefrom, and the resulting sediment from said centrifuging is then suspended in a buffer medium. The buffer employed should have a pH of about 6 and preferably potassium phosphate is utilized as same, although other equivalent buffers may be substituted. One may also include in said buffer, detergent materials, sodium taurocholate, and/or isooctylphenoxypolyoxyethanol. While the above materials are not necessary to the subject process, it has been found that they facilitate same, both alone and in combination. Preferably, one includes isooctylphenoxypolyoxyethanol and sodium taurocholate in the preferred potassium phosphate buffer. The resulting suspension is then homogenized in a blender and the homogenized mixture is again centrifuged to obtain the enzyme containing supernatant. In the second step of the subject process, said enzyme containing supernatant is fractionated with ammonium sulfate by the following procedure. Solid ammonium sulfate is added with stirring to the enzyme extract and the mixture is stirred until all of the ammonium sulfate is dissolved, and the suspension is centrifuged. The resulting sedimented material is then discarded and additional ammonium sulfate is added to the supernatant solution. After stirring for from about 30 minutes to 3 hours and centrifuging as above, a film containing most of the glucocerebrosidase activity appears on the surface of the liquid. Said film is then carefully skimmed off and suspended in citrate-phosphate buffer solution, pH 6.0. Preferably, citrate-phosphate buffer, pH 6.0 is employed, but it is noted that other equivalent buffers may also be employed. In addition, as in step one of the subject process, one may also include with said buffer, detergent materials, sodium taurocholate, and/or isooctylphenoxypolyoxyethanol. While the above materials are not necessary to the subject process, it has been found that they facilitate same, both alone and in combination. Preferably, isooctylphenoxypolyoxy and sodium taurocholate are included in the preferred citrate phosphate buffer. If said additional materials are employed in either step one or two, about 0.5 mg/ml to about 25 mg/ml of said materials may be included. The concentration of citrate-phosphate buffer-enzyme mixture is then adjusted to between 30 and 40 mg/ml and the suspension dialyzed against the citrate-phosphate buffer pH 4.2 The resulting suspension is then centrifuged to obtain a clear supernatant solution containing the subject enzyme.

Said enzyme containing solution is then treated according to the third step of the subject process so as to purify same. Approximately 250 ml of the solution are carefully layered on a column (9 × 55 cm) of Sephadex G-200 which had been previously equilibrated with citrate-phosphate buffer, pH 5.0. Glucocerebrosidase is eluted from the column with the same solution and enzyme fractions are pooled and applied to a column (4 × 50 cm) of CM-Sephadex A-25, which has previously been equilibrated with the same solution. The enzyme was eluted from the column with a linear gradient of NaCl ranging from 0 to 500 mM in citratephosphate buffer at pH 5.0. The enzyme appears when the concentration of NaCl is approximately 250 mM. Enzyme fractions are then pooled and dialyzed against citrate-phosphate buffer, pH 5.0, containing glycerol, EDTA, dithiothreitol, and isooctylphenoxypolyoxyethanol. The sample is then placed on a column (2.5 × 50 cm) of Cellex-P, previously equilibrated with the same buffer mixture used for dialysis. The enzyme is eluted with a NaCl gradient ranging from 0 to 500 mM. Peak enzyme fractions are again pooled and dialyzed against the same buffer solution containing glycerol, EDTA, and dithiothreitol. The enzyme is rechromatographed twice on columns (2 × 20 cm) of CM-Sephadex using the same conditions employed for the Cellex-P chromatography. In all chromatographic steps the enzyme in the most active fractions is pooled for subsequent steps. After the last CM-Sephadex elution, peak enzyme fractions are dialyzed against citrate-phosphate buffer, pH 5.5, containing glycerol, EDTA, dithiothreitol, and isooctylphenoxypolyoxyethanol.

Initial studies indicated that glucocerebrosidase was largely bound to subcellular particulate material, and as noted, sodium taurocholate was preferred for increased extraction of the enzyme. Isooctylphenoxypolyoxyethanol was not necessary for the extraction, but because it was preferred in the fractionation steps which followed, it was routinely included in the initial extraction. The effect of sodium taurocholate appears to be principally one of solubilization of the enzyzme since addition of this salt to enzyme extracts obtained in its absence did not enhance their catalytic activity. Additional evidence for a dispersing effect of detergents was obtained by comparing the elution of glucocerebrosidase from Sephadex. When the enzyme was extracted from placenta with buffer alone, the elution profile was extremely heterogeneous with peaks of activity ranging from 60,000 to large components of over 300,000 daltons. The >300,000 - dalton complexes did not appear when the enzyme was extracted with detergent.

The overall recovery of purified glucocerebrosidase with the present procedure averaged about 5% of the starting activity which represents the recovery of 330 μg of enzyme protein from 1.7 kg of fresh placental tissue. Glycerol and dithiothreitol were found to be essential for stabilizing the enzyme in the latter stages of chromatographic separation, particularly when the enzyme was eluted by increasing concentrations of NaCl. Storing the enzyme at 4° overnight in the final buffer mixture containing 50% glycerol, EDTA, and dithiothreitol caused a 36% stimulation in the total activity recovered.

The question of the homogeneity of the purified glucocerebrosidase cannot be completely resolved at this time. The purified enzyme did not migrate into the separating gel of various polyacrylamide disc gel systems even when low concentrations of gel were used or urea was added to the preparations. Glucocerebrosidase accumulated at the interface between the stacking gel and the separating gel. However, in a systematic study of the electrophoretic mobility of glucocerebrosidase in sodium dodecyl sulfate gels, the enzyme migrated as a single sharp band with an apparent molecular weight of 60,000. The activity of 14 widely distributed hydrolytic enzymes was monitored in unfractionated placental extracts and in the final glucocerebrosidase fraction to show that purified glucocerebrosidase is free of contamination by these enzymes. The ratio of glucocerebrosidase activity to 4-methylumbelliferyl-B-D-glucosidase was determined at all of the purification steps. The ratio of catalytic activity with the natural lipid compared with the artificial substrate increased through the purification steps to the Cellex-P chromatography at which point the ratio became relatively constant. Glucosylsphingosine is also hydrolyzed by the purified enzyme, although to a much lesser extent than glucocerebroside.

The effect of altering the pH of the incubation mixture on the hydrolysis of glucocerebroside and 4-methylumbelliferyl-B-D-glucopyranoside has been shown. The optimal pH for both substrates with the highly purified enzyme is in the region of pH 6.0 to 6.6.

The most highly purified preparation of glucocerebrosidase which is obtained by the subject invention appears to be pure when judged by the criteria of homogeneity which can be applied to this particular enzyme. The final product is enriched 4100-fold over that in unfractionated extracts of placental tissue and it is free from contamination with 14 other common lysosomal hydrolases. The purified enzyme migrates as a single sharp band in sodium dodecyl sulfate gels and rechromatography of the purified enzyme on CM-Sephadex does not increase the specific activity of the enzyme. Moreover, the protein-activity profiles which are obtained are superimposable. In addition, the native enzyme does not migrate into polyacrylamide gels; therefore, the purified enzyme could not be screened for subtle charge-density differences. The final stage of purification yields an enzyme with a maximum specific activity of 1 mmole of glucocerebroside cleaved per mg of protein per hour at the optimal substrate concentration as compared to specific activities of 0.026, 0.0074, and 0.000012, reported for partially purified preparations from rat intestine, beef spleen, and human spleen, respectively. As previously noted, detergents are preferably for the effective extraction of the enzyme from the tissue and for maintaining the enzyme in a state which permitted chromatographic resolution, while the addition of glycerol and dithiothreitol stabilized the purified glucocerebrosidase.

The use of said detergents does effect the molecular size of the resulting enzyme in that the enzyme shows considerable variation depending on the method of extraction and state of purity. Extracting the placenta with buffer alone yields a molecular weight profile with peaks in the region of 60,000, 120,000, 240,000 and still heavier components with molecular weights over 300,000 while the use of detergents disaggregate the >300,000 molecular weight fraction into lower molecular weight components. When extracted with detergent, the isolated enzyme appears rather homogeneous in size with a molecular weight of 240,000.

Moreover, the enzyme is a single-homogeneous protein which is a tetramer composed of 4 catalytically active subunits whose mass is 60,000 daltons each.

EXAMPLES

Example 1

Extraction of Enzyme — Chilled fresh placentas were freed of adhering blood by rinsing with cold distilled water. The soft placental tissue was then passed through a meat grinder and the ground tissue was suspended in 3 volumes (w/v) of distilled water and stirred for 1 hour at 4°. The suspension was then centrifuged at 10,000 × g for 20 minutes. The supernatant was then decanted and the sedimented material was suspended in 2 volumes (v/v) of 20 mM potassium phosphate buffer pH 6.0 containing 2 mg of isooctylphenoxypolyoxyethanol and 10 mg of sodium taurocholate per ml (w/v). The suspension was then homogenized in a Waring blender for 1 minute at 4° and the homogenized material was centrifuged at 10,000 × g for 25 minutes. The resulting supernatant solution was processed in the following manner.

Ammonium Sulfate Fractionation — Solid ammonium sulfate, 247 g/l, was added with stirring to the enzyme extract and the mixture was stirred until all of the $(NH_4)_2SO_4$ had dissolved. The suspension was then centrifuged at 10,000 × g for 30 minutes and the sedimented material was discarded. 70.25 g of ammonium sulfate per liter of the supernatant solution was then added. After stirring for 1 hour and centrifuging as above, a film containing most of the glucocerebrosidase activity appeared on the surface of the liquid. This film was carefully skimmed off and suspended in 20 mM citrate-phosphate buffer solution pH 6.0, which also contained 2 mg of isooctylphenoxypolyoxyethanol and 10 mg of sodium taurocholate per ml. The protein concentration was adjusted to between 30 and 40 mg per ml, and the suspension was dialyzed for 24 hours against 20 mM citrate-phosphate buffer pH 4.2 which contained 2 mg of isooctylphenoxypolyoxyethanol per ml. The suspension was then centrifuged at 40,000 × g for 30 minutes and the clear supernatant solution containing the enzyme was treated as follows.

Gel Filtration and Ion-Exchange Chromatography — Approximately 250 ml of the solution were carefully layered on a 9 × 55 cm column of Sephadex G-200 which had been previously equilibrated with 20 mM citrate-phosphate buffer pH 5.0 containing 2 mg of isooctylphenoxypolyoxyethanol per ml. Glucocerebrosidase was eluted from the column with the same solution and the enzyme-containing fractions were pooled and applied to a 4 × 50 cm column of CM-Sephadex A-25 previously equilibrated with the same solution. The enzyme was eluted from the column with 2 liters of a linear gradient of NaCl ranging from 0 to 500 mM in 20 mM citrate-phosphate buffer at pH 5.0 containing 2 mg of isooctylphenoxypolyoxyethanol per ml. The enzyme appeared when the concentration of NaCl was approximately 250 mM. The resulting enzyme fractions were pooled and dialyzed against 20 mM citrate-phosphate buffer, pH 5.0, containing 20% glycerol (w/v), 5 mM EDTA, 1 mM dithiothreitol, and 2 mg of isooctylphenoxypolyoxyethanol per ml. The sample was then placed on a column (2.5 × 50 cm) of Cellex-P previously equilibrated with the same buffer mixture used for dialysis. The enzyme was eluted with 1 liter of a NaCl gradient ranging from 0 to 500 mM. Peak enzyme fractions were pooled and again dialyzed against the same buffer solution containing glycerol, EDTA, and dithiothreitol. The enzyme was rechromatographed twice on 2 × 20 cm columns of CM-Sephadex using the same conditions employed for the Cellex-P chromatography. In all chromatographic steps the enzyme was eluted as a single symmetrical peak from which the majority of enzyme in the most active fractions was pooled for subsequent steps. After the last CM-Sephadex elution, peak enzyme fractions were dialyzed against 20 mM citrate-phosphate buffer, pH 5.5, containing 50% glycerol, 5 mM EDTA, 1 mM dithiothreitol, and 2 mg of isooctylphenoxypolyoxyethanol per ml. The final preparation catalyzes the hydrolysis of 1 mmole of glucocerebroside per mg. of protein per hour and represents an enrichment of 4100-fold over the activity in the initial placental extracts. The yield of enzyme at this final step was 5%.

Example 2

Fresh placental tissue was homogenized in 3 volumes (w/v) of 20 mM potassium phosphate buffer, pH 6.0, with 2 mg of isooctylphenoxypolyoxyethanol and 10 mg of sodium taurocholate per ml where indicated. The suspensions were centrifuged at 100,000 × g for 1 hour and aliquots of the supernatant solutions were assayed for glucocerebrosidase activity. When sodium taurocholate was not employed in the extraction, 10 mg of it were added per ml of supernatant prior to assay.

| Method of extraction | Addition to supertant after extraction | Enzyme activity recovered |
|---|---|---|
| | | units/g tissue |
| Buffer alone | | 103 |
| Buffer alone | Sodium taurocholate | 89 |
| Buffer + isooctylphenoxypolyoxyethanol | | 363 |
| Buffer + isooctylphenoxypolyoxyethanol + sodium taurocholate | | 1042 |

Example 3

Assays were carried out in 0.2 ml of 50 mM citrate-phosphate buffer, pH 4.5, containing 0.02% (w/v) Triton X-100, 1.25 mM substrate and an aliquot of the enzyme from Example 1. B-Glucosidase activity was measured at pH 6.4. Following incubation at 37° for 1 hour, the reactions were stopped and fluorescence or optical density was determined. One unit of enzymatic activity is defined as representing the hydrolysis of 1 nmole of substrate under these conditions of assay.

| Enzyme | Source of enzyme | |
|---|---|---|
| | Crude placental extract | Purified glucocerebrosidase |
| | units of activity/100 units of glucocerebrosidase activity | |
| B-D-Glucosidase | 50 | 4.2 |
| N-Acetyl-B-D-glucosaminidase | 1960 | 0.03 |
| N-Acetyl-B-D-galactosaminidase | 330 | 0 |
| Phosphatase | 210 | 0 |
| Sulfatase | 0 | 0 |
| a-L-Fucosidase | | 0 |
| B-L-Fucosidase | 0 | |
| a-D-Galactosidase | 30 | 0 |
| B-D-Galactosidase | 150 | 0.05 |
| a-D-Glucosidase | 250 | 0 |
| a-D-Mannosidase | 180 | 0.02 |
| B-D-Mannosidase | | 0 |
| B-D-Glucuronidase | 290 | 0 |
| a-L-Arabinosidase | 7 | 0 |
| B-D-Xylosidase | 0 | 0 |

The embodiments of the invention in which an exclusive property or privilege is claimed are defined as follows:

1. A process for isolating glucocerebrosidase comprising suspending in an aqueous pH6 phosphate buffer containing from about 0.5 mg/ml to about 25 mg/ml isooctylphenoxypolyoxyethanol and from about 0.5 mg/ml to about 25 mg/ml sodium taurocholate, the sediment layer resulting from centrifuging fresh ground placenta tissue in an aqueous medium at a temperature of from 1°C to 20°C for a period of from 5 minutes to 4 hours, homogenizing same, adding 247 grams/liter of ammonium sulfate, centrifuging the resulting mixture, adding 70.25 grams/liter ammonium sulfate to the resulting supernatant and centrifuging the mixture a second time, skimming the resulting glucocerebrosidase containing film, resuspending same in a pH6 citrate phosphate buffer containing from about 0.5 mg/ml to about 25 mg/ml isooctylphenoxypolyoxyethanol and from about 0.5 mg/ml to about 25 mg/ml sodium taurocholate, dialyzing the resulting mixture against a p H 9.2 citrate phosphate buffer, filtering the resulting enzyme and chromatographing said enzyme by ion enchange chromatography with a sodium chloride gradient ranging from 0 to 500 millimoles.

2. The product produced by the process of claim 1 which will catalyze the hydrolysis of 1 mmole of glucocerebroside per milligram of protein per hour.

* * * * *